W. T. CARROLL.

Assignor, by mesne assignments, to THE SAWYER SPINDLE CO.

Spindle and Whirl for Spinning Machines.

No. 9,565. Reissued Feb. 15, 1881.

Attest,
W. H. H. Knight
G. F. O'Connor

Inventor.
William T. Carroll.
by Crosby Gregory Attys

N. PETERS, PHOTO-LITHOGRAPHER, WASHINGTON, D. C.

UNITED STATES PATENT OFFICE.

WILLIAM T. CARROLL, OF WORCESTER, ASSIGNOR, BY MESNE ASSIGNMENTS, TO THE SAWYER SPINDLE COMPANY, OF BOSTON, MASSACHUSETTS.

SPINDLE AND WHIRL FOR SPINNING-MACHINES.

SPECIFICATION forming part of Reissued Letters Patent No. 9,565, dated February 15, 1881.

Original No. 123,867, dated February 20, 1872. Application for reissue filed October 7, 1880.

*To all whom it may concern:*

Be it known that I, WILLIAM T. CARROLL, formerly of Woonsocket, in the county of Providence and State of Rhode Island, but now of Worcester, in the county of Worcester and State of Massachusetts, have invented certain new and useful Improvements in Spindles and Whirls for Spinning-Machines, of which the following description, in connection with the accompanying drawings, is a specification.

Figure 1:
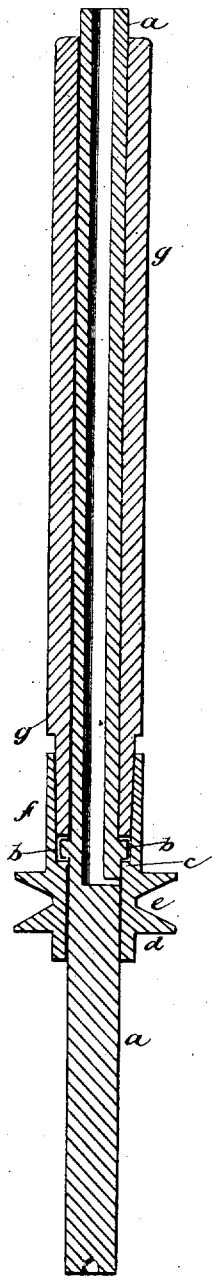
Figure 2:
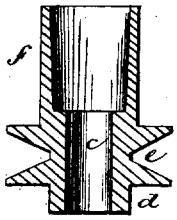

Figure 1 in the drawings is a central vertical section of my improved spindle and whirl with a bobbin adapted thereto pressed into the whirl-socket; and Fig. 2 is an enlarged vertical section of the whirl, showing the inclination or taper of its inner surface.

This invention relates to certain new and useful improvements in spindles and whirls, and has for its objects to so hold and drive a bobbin, as hereinafter set forth, as to prevent it from being split, as is now frequently the case with bobbins driven by friction applied to their internal surfaces; also, to secure lightness in the parts to be rotated to carry the bobbin and its load during spinning, thereby saving power.

My invention consists in a spindle formed with a shoulder, combined with a whirl having a shoulder, and made hollow to receive the tapering bottom of a bobbin, as hereinafter specified; also, in a bobbin tapered at and made smaller toward its lower end, to be driven by external friction; also, in a spindle and a revolving internally-tapered socket surrounding it, the socket being adapted to surround and embrace the tapered lower end of the bobbin and drive it by frictional adhesion applied to its outer surface, substantially as hereinafter described.

In this my invention the bobbin is driven by the whirl through the friction or adhesion of the whirl upon the described tapering surface with which it is in contact, and the degree or direction of the pressure which causes such adhesion is exerted toward rather than from the center of the bobbin, obviating splitting the bobbin, thus making it more durable, and at the same time the bobbin is lighter in weight than the usual bobbin, having a chambered base to fit over a tube of a whirl or spindle, and requires less stock to produce it. A most essential advantage derived from the employment of a bobbin of this kind driven from its tapered outside surface (over an ordinary bobbin driven by adhesive surfaces inside the bobbin) is, that by so doing it is possible to gain a greater extent of frictional or adhesive surface operating farther from the center of the bobbin, thus preventing slippage.

When a bobbin is made to be driven by frictional contact between the spindle or whirl and the inner surface of the bobbin, such spindle or whirl acts as a powerful wedge to split the bobbin, and consequently bobbins, to prevent their being split, are made thicker and heavier than would otherwise be necessary in order to strengthen them. Notwithstanding this precaution the splitting of this class of bobbins is in practice a serious evil. In my invention, however, the socket or cup which drives the bobbin is made to receive the bobbin and act upon the latter externally like a hoop rather than internally like a wedge, thus effectually preventing the bobbin from being split as it is being driven. This invention makes it practicable to use a lighter bobbin, thus effecting a saving in the power required to drive the spinning-machine.

*a a* in the drawings represent a spindle formed with a collar or rim, *b*. The spindle *a* passes through the usual spindle-rails, (not here shown,) between which rails (and inclosing the spindles) is a collar having a set-screw, by means of which the spindle is held in such position that the shoulder *b* does not come in contact with the shoulder *c*. The function of the shoulder *b* is to prevent the whirl from being drawn off the spindle with the bobbin when the latter is removed.

The shoulder *c* is formed by the lower stem, *d*, of a whirl, *e*, which has an upwardly-projecting socketed part, *f*, tapered internally to receive the externally-tapered end of the bobbin *g*.

The bobbin *g* is placed over the spindle *a*, and its tapering end is made to fit against and be held adhesively by the inner tapered portion or face of the socket or cup *f*, the fit between the said two surfaces being sufficiently close to insure the movement of the bobbin in unison with the socket to spin and wind properly. The tapering form of the end of the bobbin *g* prevents the wear of the bobbin from lessening at any time its bearing in the socket *f*, into which it is pressed farther down as it wears away.

By placing the bobbin *g* within the socket the splitting of the bobbin, which often occurs when it is pressed down over the spindle or whirl-stem, is obviated.

By making the stem *f* of the whirl *e* hollow less metal is required in its construction, lightness of the whirl is secured, and saving of power is effected.

I am aware of Patent No. 83,354, October 20, 1868, wherein a headed bobbin is embraced externally by the bent ends or arms of a spring-holder composed of wire, the arms touching the bobbin-head in but two places; but the said holder does not embrace and drive the bobbin, as does the socket part herein described.

I am also aware, in roving or flier frames, that the lower end of the bobbin has been inserted within a recess at the top of the bobbin-driving gear, the said bobbin being engaged by a pin carried by the said gear.

The inner surface of the socket or stem *f* is tapered, as shown clearly in Fig. 2, to co-operate with the tapering external surface of the lower end of the bobbin. This taper given to the stem insures an increased amount of adhesion or frictional driving-surface for the bobbin over what would be the case were the interior of the stem *f* cylindrical.

I claim—

1. A spindle, *a*, formed with a shoulder, *b*, combined with a whirl, *e*, having a shoulder, *c*, and made hollow, so as to receive the tapering bottom of a bobbin, *g*, all as specified.

2. A spinning-machine bobbin tapered at and made smaller toward its lower end, to be driven by external friction, substantially as described.

3. In a spinning-machine, a spindle and a revolving internally-tapered socket surrounding it, the socket being adapted to surround and embrace the tapered lower end of a bobbin and drive it by frictional adhesion applied to its outer surface, substantially as described.

WILLIAM T. CARROLL.

Witnesses:

WM. F. DRAPER,

W. F. DRAPER, JR.